(12) United States Patent
Sakaguchi

(10) Patent No.: US 9,288,868 B2
(45) Date of Patent: Mar. 15, 2016

(54) COLLECTING/RECYCLING SYSTEM OF ORGANIC EL LIGHTING DEVICE

(75) Inventor: Yoshikazu Sakaguchi, Tokyo (JP)

(73) Assignee: NEC LIGHTING, LTD., Tokyo (JP)

( * ) Notice: Subject to any disclaimer, the term of this patent is extended or adjusted under 35 U.S.C. 154(b) by 304 days.

(21) Appl. No.: 13/878,476

(22) PCT Filed: Oct. 20, 2011

(86) PCT No.: PCT/JP2011/074158
§ 371 (c)(1),
(2), (4) Date: Apr. 9, 2013

(87) PCT Pub. No.: WO2012/063616
PCT Pub. Date: May 18, 2012

(65) Prior Publication Data
US 2013/0217292 A1  Aug. 22, 2013

(30) Foreign Application Priority Data
Nov. 8, 2010  (JP) .................... 2010-249736

(51) Int. Cl.
*H05B 33/10* (2006.01)
*B09B 5/00* (2006.01)
*G06Q 50/00* (2012.01)

(52) U.S. Cl.
CPC *H05B 33/10* (2013.01); *B09B 5/00* (2013.01); *G06Q 50/00* (2013.01)

(58) Field of Classification Search
CPC combination set(s) only.
See application file for complete search history.

(56) References Cited

U.S. PATENT DOCUMENTS

| 6,529,788 | B1 | 3/2003 | Tani et al. |
| 8,317,896 | B2 | 11/2012 | Homma et al. |
| 2008/0261477 | A1 | 10/2008 | Nomura et al. |
| 2011/0017020 | A1 | 1/2011 | Homma et al. |
| 2012/0125853 | A1 | 5/2012 | Nomura et al. |

FOREIGN PATENT DOCUMENTS

| JP | 2000-181958 A | 6/2000 |
| JP | 2008-144269 A | 6/2008 |
| JP | 2009-206009 A | 9/2009 |
| JP | 4533964 B | 9/2010 |
| WO | WO 2009/087908 A1 | 7/2009 |
| WO | WO2009/087908 A1 | 7/2009 |

OTHER PUBLICATIONS

International Search Report in PCT/JP2011/074158 dated Dec. 13, 2011 (English Translation Thereof).
Japanese Office Action dated Mar. 4, 2014 with a partial English translation.

*Primary Examiner* — Nimeshkumar Patel
*Assistant Examiner* — Brenitra M Lee
(74) *Attorney, Agent, or Firm* — McGinn IP Law Group, PLLC.

(57) ABSTRACT

A collecting/recycling system includes: information collecting section 10 that obtains a status of the organic EL panel used in a market; information processing section 20 that processes and stores, as collection/recycling information, information about a reutilizable member, part, and material of the organic EL panel; collection/recycling predicting section 30 that predicts the timing and quantity of the reutilizable member, part, and material of the organic EL panel, whose the status has been obtained by information collecting section 10, to be distributed to a recycling step based on the collection/recycling information stored in information processing section 20; and production plan setting section 40 that sets a production plan of a recycled organic EL panel using the reutilizable member/part/material based on the timing and quantity predicted by collection/recycling predicting section 30.

11 Claims, 7 Drawing Sheets

COLLECTING/RECYCLING SYSTEM OF ORGANIC EL LIGHTING DEVICE

TECHNICAL FIELD

The present invention relates to a collecting/renewing system of an organic EL lighting device.

BACKGROUND ART

In an organic EL panel used in an organic EL lighting device, on a transparent supporting board including a transparent conductive film such as ITO as an anode, for example, a hole injecting layer, a hole transporting layer, a RGB emitting layer, a hole block layer, and an electron transporting layer are formed; and, furthermore, an electron injecting material and a cathode electrode are formed to form an organic EL element part. Then, a sealing/heat-transferring agent, etc. are applied thereon, and, for example, an opposing glass (sealing cap) is bonded to a peripheral part thereof with a sealing agent, thereby blocking it from the external environment.

Generally, a sputtering apparatus is used for formation of a transparent electrode, a vapor deposition apparatus is used for formation of an organic film, and an application apparatus such as an ODF, screen, inkjet (IJ), or dispenser is used for formation of the sealing agent or the heat transferring agent. For example, IJ or a slit applying apparatus is used for a polymer-based organic EL element; and, for example, a CVD apparatus is used for carrying out film sealing. Furthermore, when preceding processes including board cleaning thereof, patterning steps, etc. and post-processes including formation into modules, etc. are included, an extremely large number of steps are carried out as well as semiconductor and FPD.

When organic EL lighting is viewed from the aspect of a business, organic EL panels require various materials such as organic materials, inorganic materials, metals, and adhesive agents. Moreover, used members and used materials are extremely expensive, and manufacturing apparatuses thereof are also expensive. When the cost of materials used in manufacturing, fixed cost, depreciation cost, etc. are taken into consideration, the price or selling price thereof is about several times higher compared with that of an existing lighting device. Therefore, it is not easy to establish a profitable business using organic EL parts. Specifically, when a list showing the breakdown of manufacturing cost is viewed, fixed cost is around 30%, and variable cost is around 65%.

Furthermore, in view of details of the manufacturing cost, most of the variable cost is occupied by material cost of direct material cost, which is a main cause of the high manufacturing cost. The material cost rate is high as described above, and the unit prices of materials per se are extremely high. Therefore, it is thought to be almost impossible that EL lighting can used to establish a profitable business having normal manufacturing, distribution and sales channels.

Look at the list showing the breakdown of manufacturing cost, organic EL element materials occupy around 70%, an anode transparent electrode board is next to that and is around 20%, and sealing members such as sealing boards are around 5%. Therefore, reducing the cost of the organic EL element materials, anode boards, and sealing members is important for reducing the cost of the organic EL panel. A measure for reducing the organic EL element material cost rate will be reviewed. It is difficult to directly reutilize organic materials after brightness has deteriorated. However, an organic metal complex using a noble metal such as platinum (Pt) or iridium (Ir) as a central metal is used as a light emitting material dopant; lithium (Li), which is a rare earth metal and is becoming more difficult to obtain since demands therefor have been significantly increased recently for lithium ion batteries, is used as an electron injecting material; and a high-purity metal of, for example, aluminum (Al) or silver (Ag) is used in a cathode. Reducing the cost of the material cost by cost reduction and a quantity effect upon material production and collecting/recycling or diverting the materials can largely contribute to cost reduction. The anode-equipped transparent electrode board and the sealing members can be reutilized, which can largely contribute to cost reduction.

A method of collecting a metal contained in a light emitting element utilizing electroluminescence is disclosed in Patent Literature 1.

CITATION LIST

Patent Literature

Patent Literature 1: JP2008-144269A

SUMMARY OF INVENTION

Technical Problem

However, in the technique disclosed in Patent Literature 1, the metal contained in the light emitting element utilizing electroluminescence is merely collected, and collection as a whole organic EL lighting device is not taken into consideration.

The present invention has been accomplished in view of the problem of the techniques as described above, and it is an object to provide a system for collecting/recycling organic EL lighting device that is capable of reducing cost, effectively utilizing resources, and reducing the amount of discarded objects and is friendly to the environment of the earth.

Solution to Problem

In order to achieve the above described object, the present invention is a system for collecting/recycling organic EL lighting device using an organic EL panel including:

information collecting means that obtains the status of the organic EL panel used in a market;

information processing means that processes and stores, as collection/recycle information, information about a reutilizable member, part, and material of the organic EL panel;

collection/recycle predicting means that predicts the timing and quantity of the reutilizable member, part, and material of the organic EL panel, whose status has been obtained by the information collecting means, to be distributed to a recycling step based on the collection/recycle information stored in the information processing means; and production plan setting means that sets a production plan of a recycled organic EL panel using the reutilizable member/part/material based on the timing and quantity predicted by the collection/recycle predicting means.

Advantageous Effects of Invention

As explained above, in the present invention, organic EL panels can be efficiently collected and reutilized; therefore, manufacturing costs can be reduced, and the sales price thereof can be reduced as a result. Therefore, the price that is equivalent to that of other lighting devices can be achieved, which makes it profitable as a business. Moreover, by virtue of reduction in the amount of new energy consumption and reduction in the amount of discarded objects, this is friendly to the environment of the earth and is effective for preventing contamination.

Obtaining information regarding history of products becomes easy, referencing the history information for designing new products is useful for improving reliability of the products, and improvements such as extended lives of products can be made.

Moreover, while organic EL panels are reutilized, members can be shared in designing stages of products, and designing of the products in which recycling processes are easy is facilitated.

Furthermore, for a lighting business of the organic EL lighting panels, the total volumes of the organic EL panels of, for example: the shipped volume of the organic EL panels, the volumes distributed to a market such as an in-use volume in the market, the collection rate of a life-passed-over products after usage, and the renewable volume/rate including those of parts are found out, and an optimal production plan can be made. The volume of shipment is small and there is almost no collection/recycle at the beginning of the above described market; however, by estimating the probability of recycled panels and modules including parts in advance, set prices can be prevented, and price competitiveness can be obtained against other lighting devices.

DESCRIPTION OF EMBODIMENTS

Hereinafter, exemplary embodiments will be explained with reference to drawings.

First, a cost composition was analyzed in order to solve the above described problem. In view of cost composition rates of an organic EL panel, a variable cost rate (material cost rate) is around 65%, a fixed cost rate (amortization cost, etc.) is around 30%, wherein these two rates are extremely large. Therefore, reducing the material cost rate is the most effective for improving a business environment. The most effective means for reducing the material cost rate is to reduce material cost; however, it is almost impossible since the number of material suppliers related to organic EL is extremely small. As another means, so-called recycling is carried out by collecting and recycling organic EL panels, which have been shipped to a market, when the panels reach the end of the lives thereof.

Herein, the reutilization rate of incorporation of collected products thereinto and price transitions with respect to the prices thereof of the case in which all of the products in that case were new were studied with respect to the total shipment number of organic EL panels.

Figure 1:
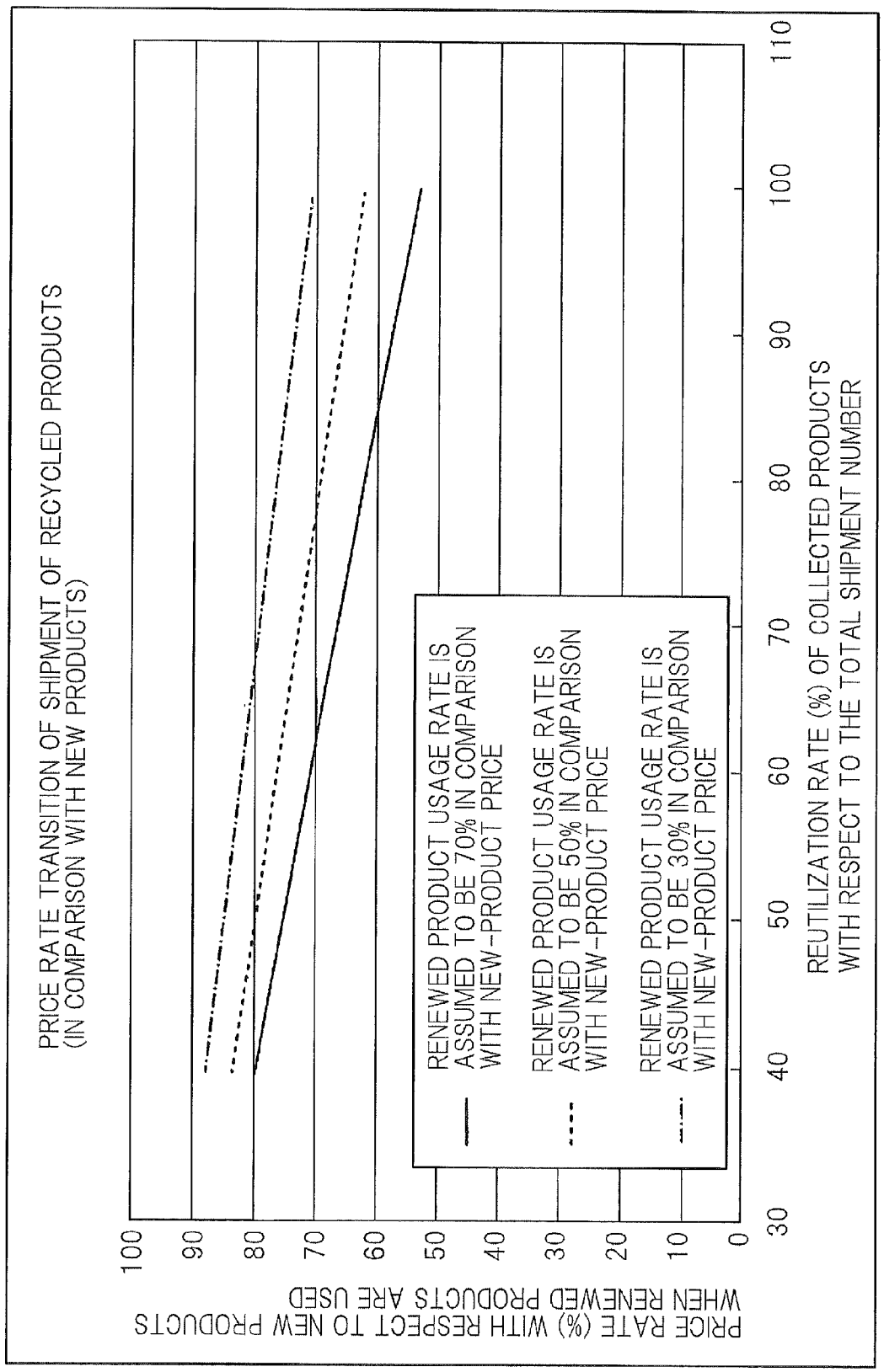
FIG. 1 is a graph showing price rate transitions of the cases in which collected/renewed products are mixed with shipment/new products.

FIG. 1 is a graph showing price rate transitions of the cases in which collected/renewed products are mixed with shipment/new products.

As shown in FIG. 1, the price of organic EL panels in the case in which all of the shipped panels had been collected and 70% thereof in terms of the cost thereof in comparison with the price thereof could be renewed and reused was reduced to about half of the case in which all products were newly manufactured. In view of this, it is recognized that way to improve collection efficiency and the way to carry out recycling and reusing organic panels is important.

Therefore, member cost is reduced by collecting and recycling organic EL panels used in organic EL lighting devices when the product lives (brightness lives) thereof have elapsed and reutilizing or recycling members, and part of processes is omitted. In this case, the organic EL panels may be sold in stores or rented or leased like conventional cases.

The collection rate of the organic EL panels can be increased by collecting the organic EL panels, which have been sold in stores, convenience stores, etc., by carry-in reversely in the stores, etc. The panels may be collected by collection boxes, postal/delivery services, etc. (freight collect may be employed as a means for increasing the collection rate), specified agents and representatives may carry out management from sales to collection, or a management department (company) may be provided to make rental or lease contracts.

In this process, in order to collect the organic EL panels, which have been manufactured, sold, used, and have passed over the product (brightness) lives thereof, at high efficiency and distribute them to recycling steps, a traceability system capable of managing the status of usage of the organic EL panels after manufacturing and sales is built. Moreover, a recycling system capable of systematically producing the collected organic EL panels as recycled/reused/reutilized products. In an actual plan, if the status of the organic EL panels used in a market is captured in a temporal manner in real-time, the timing of collection and the volume of collection can be estimated from the product life time; therefore, production plans of the rates, production number, etc. of recycled products and new products can be made appropriate. As a result, the organic EL panels in the market can be collected and efficiently systematically utilized as parts/materials of renewed products, and, as a whole organic EL lighting business, the price of the organic EL panels can be caused to be equivalent to or less than those of other lighting devices.

Figure 2:
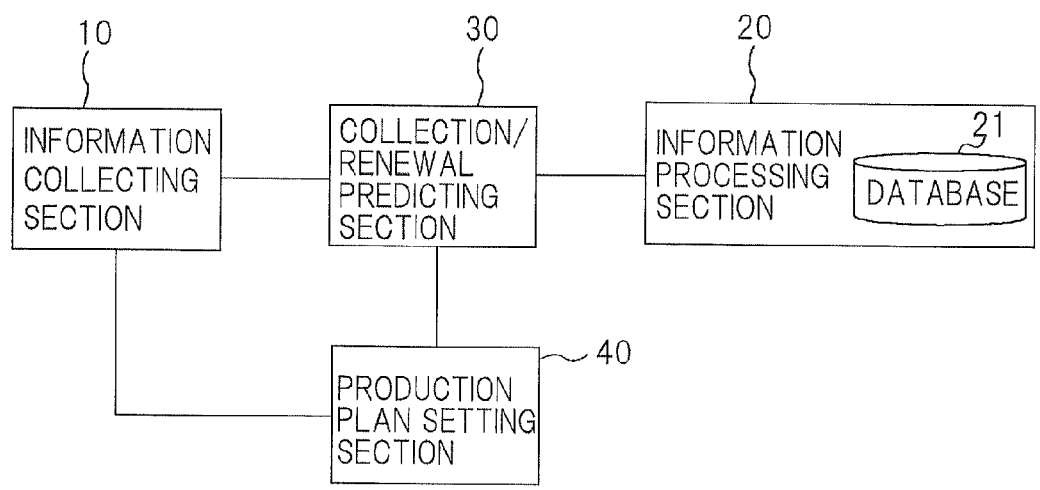
FIG. 2 is a drawing showing one exemplary embodiment of a collecting/recycling system of organic EL lighting devices.

FIG. 2 is a drawing showing one exemplary embodiment of a system for collecting/recycling organic EL lighting devices.

As shown in FIG. 2, the present exemplary embodiment includes information collecting section 10, information processing section 20, collection/recycling predicting section 30, and production plan setting section 40.

Information collecting section 10 obtains the status of the organic EL panels used in the market by finding out and managing the information and total volume of the organic EL panels as regard: the production, shipment, and sales volumes of the organic EL panels and the status of usage of in the market; the volume distributed in the market such as an in-use volume; the collection rate of the products whose product lives have expired after being used; the recycling rate and volume for disassembling and reutilizing including parts and materials of the panels; and the volume to be discarded.

Information processing section 20 processes the information about reutilizeable members, parts, and materials of the organic EL panels as collection/recycling information and stores the information in database 21.

Based on the collection/recycling information stored in database 21 of information processing section 20, collection/recycling predicting section 30 predicts the timing and quantity of the reutilizable members, parts, and materials of the organic EL panels, whose the status has been obtained by information collecting section 10, to be distributed to a recycling step.

Production plan setting section 40: sets a production plan of recycled organic EL panels using the reutilizable members, parts, and materials based on the timing and quantity predicted by collection/renewal predicting section 30; finds out the volume of the organic EL panels to be newly produced and sold and the volume to be collected, recycled, and sold; sets a production plan; and sets prices.

Hereinafter, a specific business method in a collecting/recycling system of the organic EL lighting device configured in the above described manner will be explained.

Figure 3:
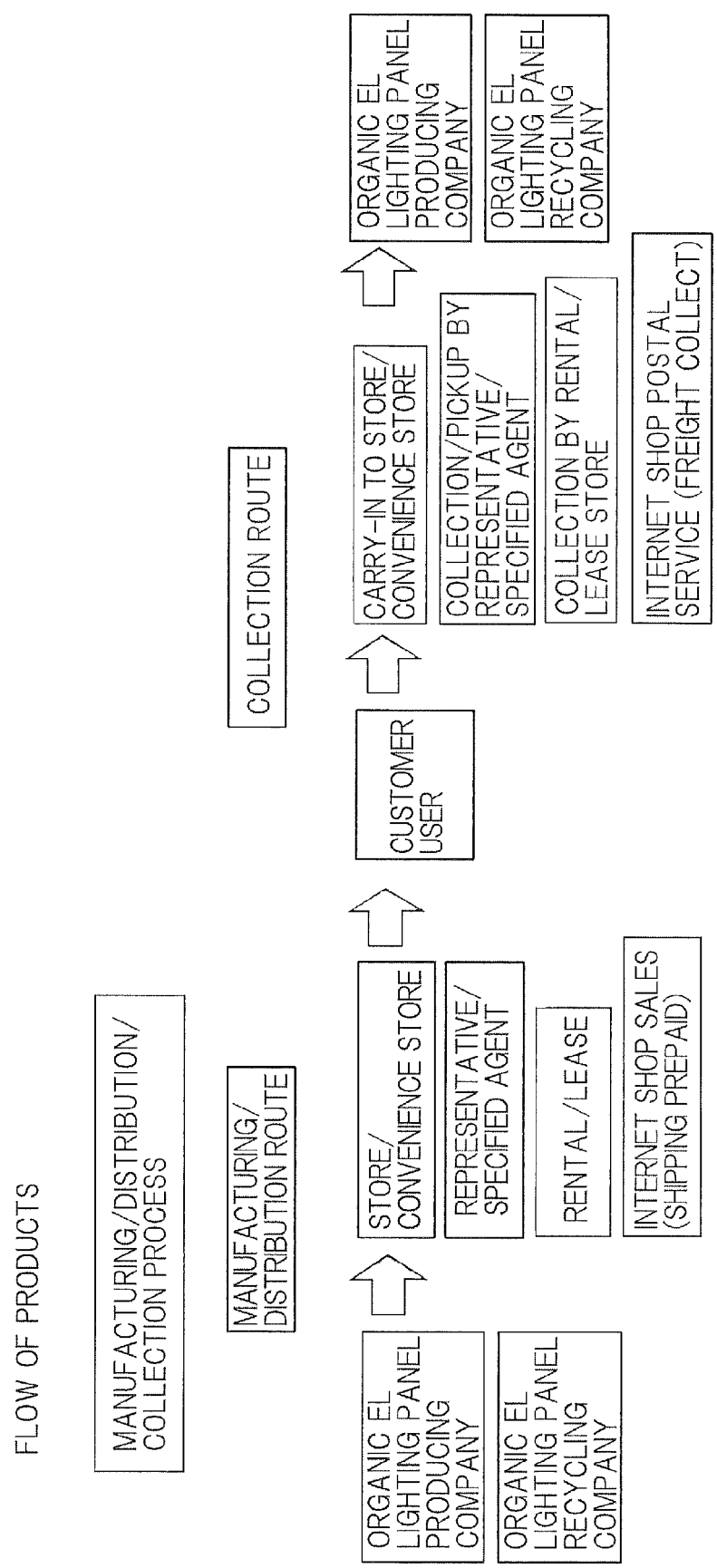
FIG. 3 is a drawing showing a specific business method in the collecting/renewing system of the organic EL lighting device shown in FIG. 2.
Figure 4:
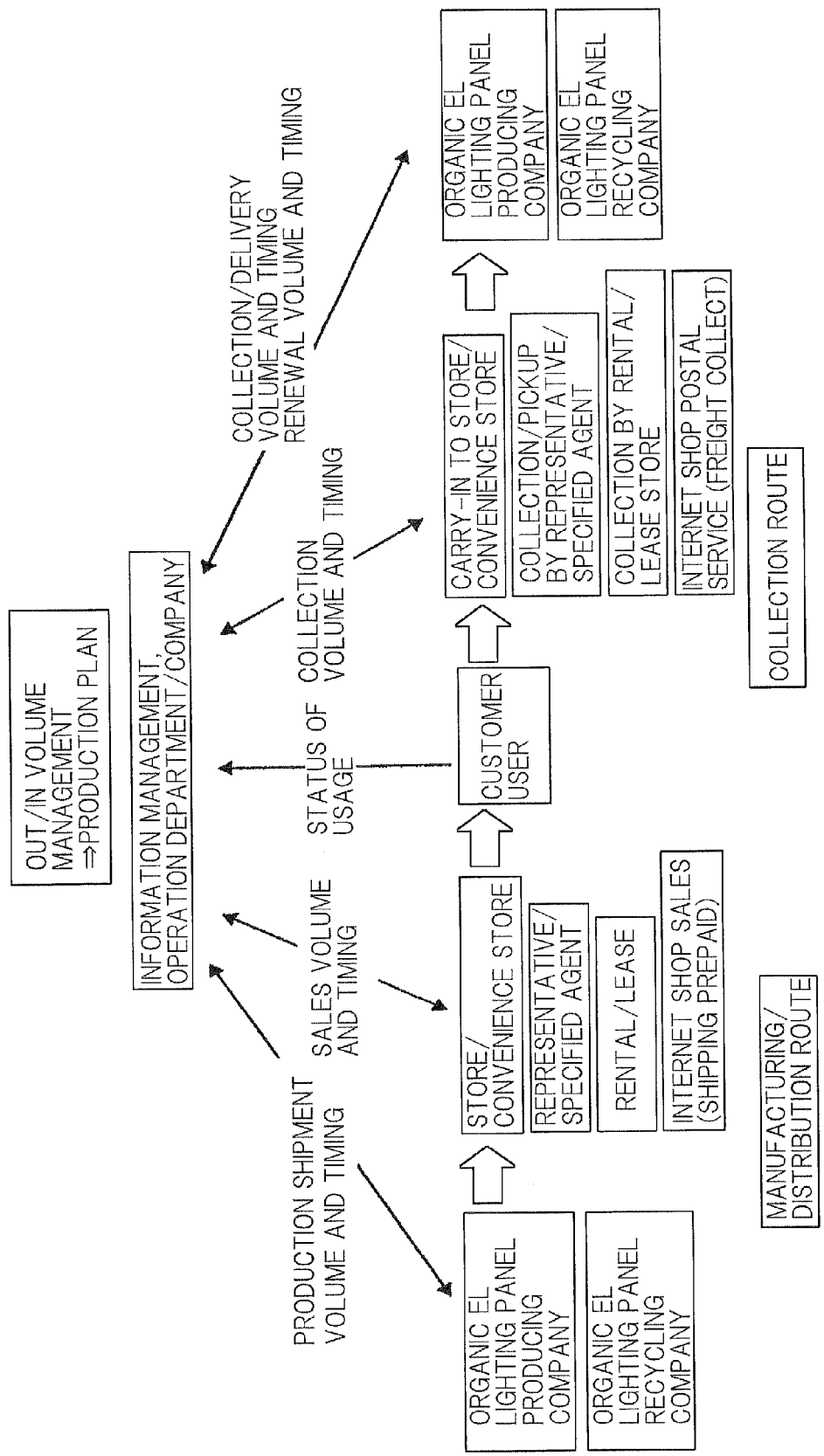
FIG. 4 is a drawing showing a specific business method in the collecting/renewing system of the organic EL lighting device shown in FIG. 2
Figure 5:
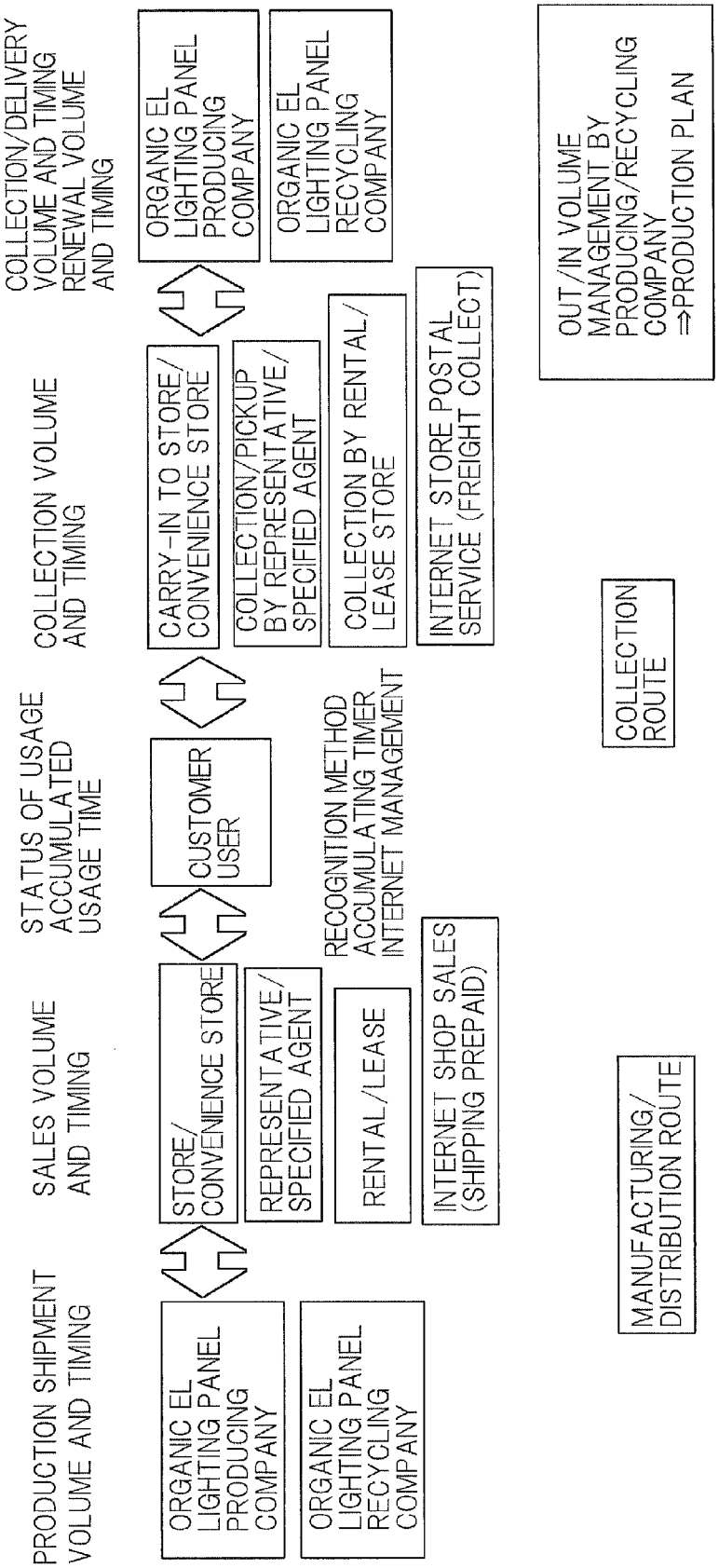
FIG. 5 is a drawing showing a specific business method in the collecting/renewing system of the organic EL lighting device shown in FIG. 2

FIG. 3 to FIG. 5 are drawings showing the specific business method in the system for collecting/recycling organic EL lighting device shown in FIG. 2.

First, a timekeeping timer, a count-up counter, an optical sensor, which observes brightness reduction, etc. and information processing devices thereof are incorporated, and the status of usage of the organic EL panel is captured so as to recognize pass-over of the product life (brightness life) of the organic EL panel. The information thereof is configured to enable recognition of the product life (brightness life) by blinking the organic EL panel or by displaying in a display device at the place of a user who uses the organic EL panel. The state of usage of the organic EL panel is obtained by information collecting section 10; however, a rental/lease system may be employed, and the status of usage may be managed by a rental/lease company. If a specified agent/representative system is employed, a company of may carry out the management.

Comprehensive information management is carried out by a producing/recycling company of the organic EL lighting device. In information processing section 20, which is owned by the producing/recycling company of the organic EL lighting device, the information about the reutilizable members, parts, and materials of the organic EL panel is stored in database 21 as collection/recycling information. In collection/recycling predicting section 30, based on the collection/recycling information stored in database 21 of information processing section 20, the transfer volume/timing, etc. of the organic EL panel in production, sales, user, collection, and recycling are captured and predicted in real time for the reutilizable members, parts, and materials of the organic EL panel for whose status has been obtained by information collecting section 10. Then, in production plan setting section 40, which is owned by the producing/recycling company of the organic lighting device, based on the timing and quantity predicted by collection/recycling predicting section 30, a production plan of recycled organic EL panels using the reutilizable members, parts, and materials is set, and the volume of organic EL panels to be newly produced and sold and the volume thereof to be collected, recycled, and sold are understood to set a production plan and set prices. A sales and collection system is operated by a lease or rental company or department, wherein the status of usage by the user and the status of stock are reliably captured. Note that the management of the status of steps of production, sales, user, collection, and recycling may be carried out by the company which manages/operates the information as described above, or that the management may be carried out by a department of a production company which manages/operates the information.

Hereinafter, a disassembling process of the collected organic EL panel will be explained.

Figure 6:
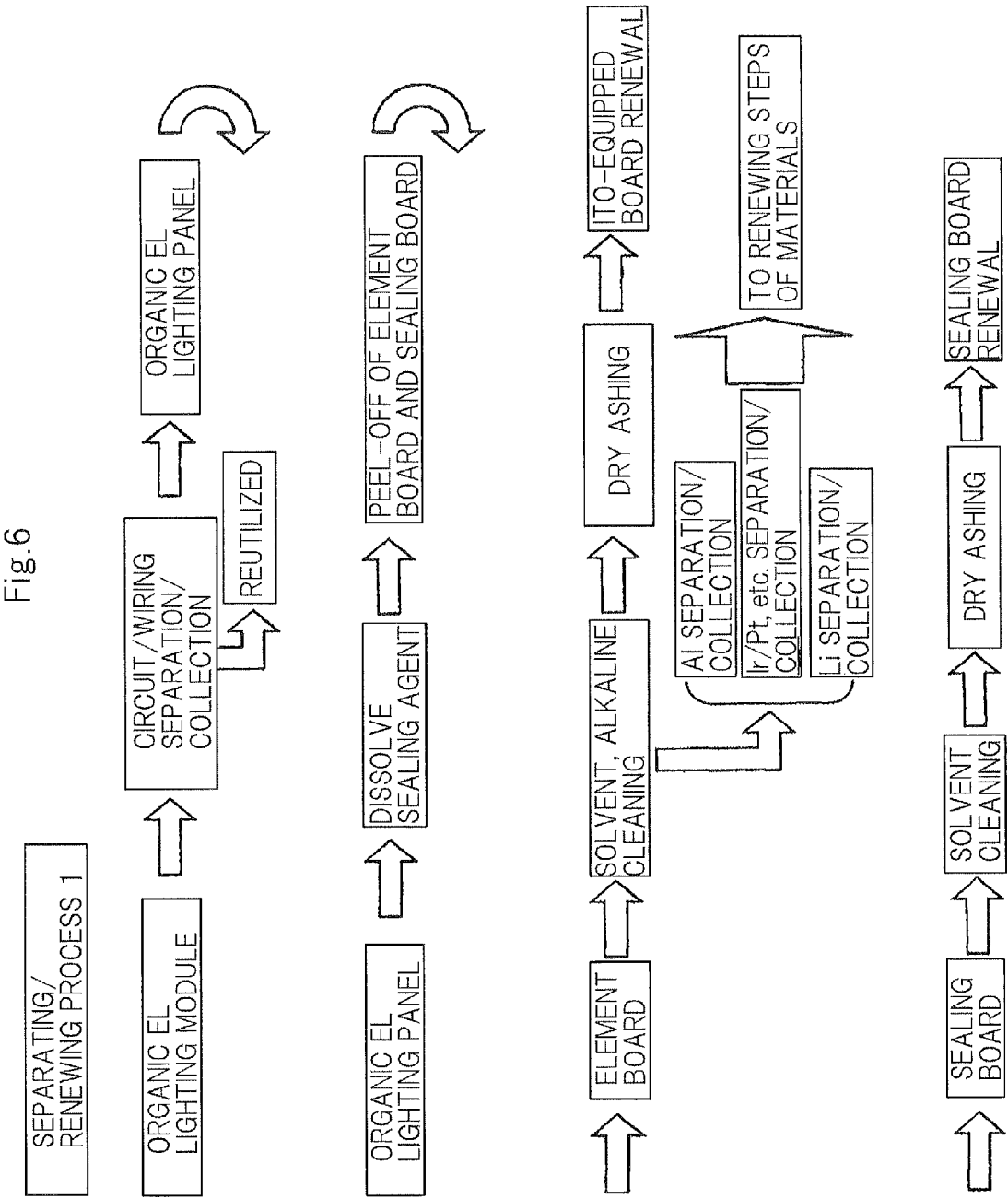
FIG. 6 is a drawing showing an example of a disassembling process of the organic EL panel used in the present invention.

FIG. 6 is a drawing showing an example of the disassembling process of the organic EL panel used in the present invention.

As shown in FIG. 6, the collected organic EL panel is subjected to recycling of members and materials in a member recycling route. In the recycling step, the collected organic EL panel is disassembled and separated into reusable members/parts, reutilizable members/parts, and materials to be recycled. Specifically, circuits and wiring members are separated and collected from the collected organic EL panel, whose product/brightness life has expired, and distributed for reutilization. The organic EL panel is subjected to mutual peel-off between an organic El element board and a sealing board, and the boards are sent to recycling steps respectively. In the organic EL element board, organic layers and electron injection layers and metal cathodes stacked thereon are separated from the board by using a solvent and alkaline cleaning. The separated and collected materials can be distributed to recycling of noble metals such as Ir and Pt or recycling steps of Li, Al, Ag, etc. The organic El element board thereafter can be recycled and reutilized as a board with a transparent electrode (ITO) after steps of dry ashing, etc. The other one, i.e., the sealing board is subjected to peel-off of a seal member between boards by solvent cleaning, dry ashing, etc. and is recycled and reutilized as a sealing board.

Hereinafter, a recycling process of the organic EL panel will be explained.

Figure 7:
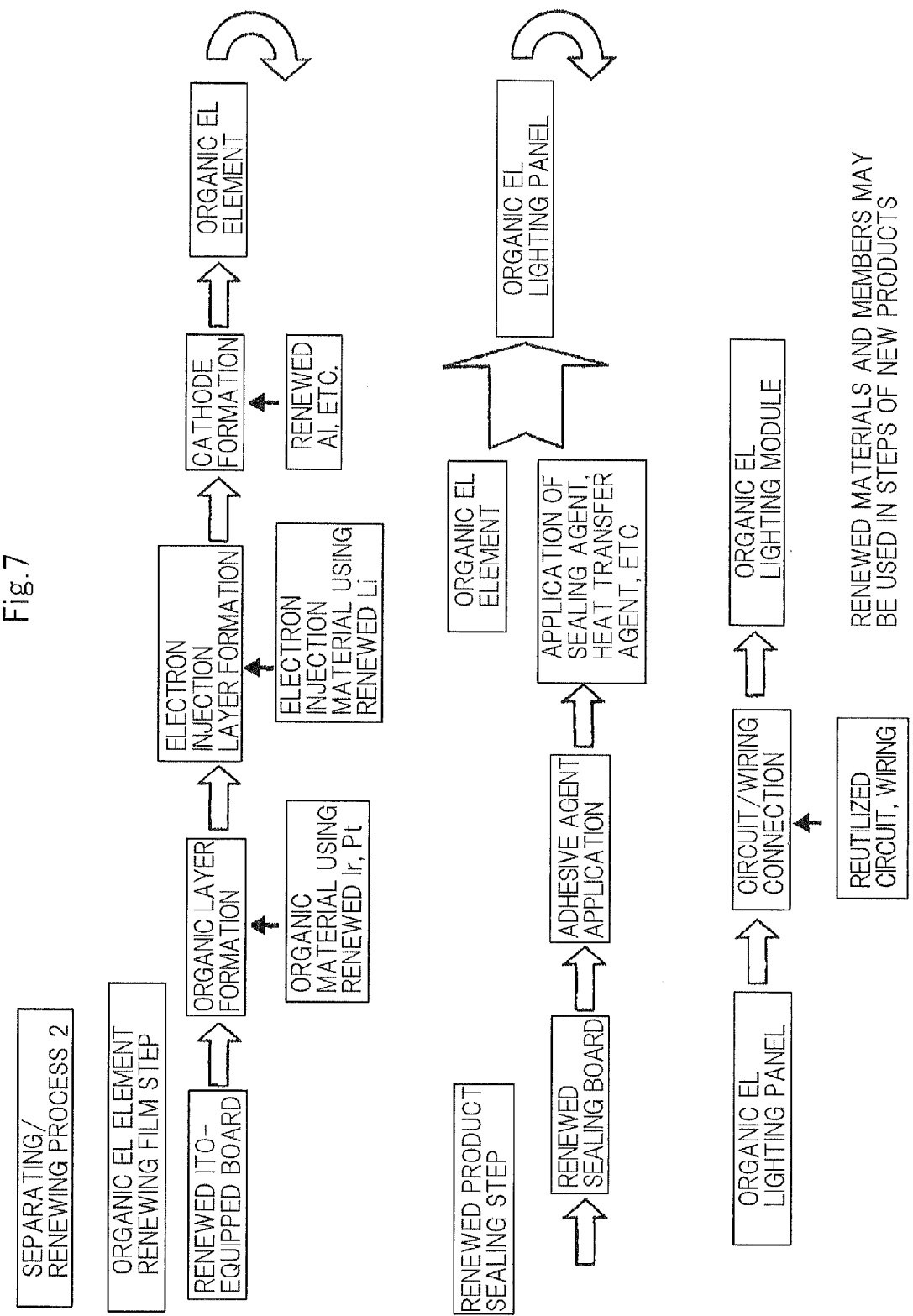
FIG. 7 is a drawing showing an example of the recycling process of the organic EL panel used in the present invention.

FIG. 7 is a drawing showing an example of the recycling process of the organic EL panel used in the present invention.

As shown in FIG. 7, when the organic El panel is to be recycled, first, an organic layer using an organic EL material of collected and recycled Ir or Pt is formed on the recycled transparent-electrode-equipped board by vacuum vapor deposition or application. Then, an electron injection layer is generated by using recycled Li, and a cathode is formed by using recycled Al or Ag, thereby preparing organic EL elements. Then, a sealing agent, a heat-transfer material, etc. are applied to the recycled sealing board, and the board is bonded with the organic EL element board to provide an organic EL panel. Recycled wiring and circuits are further attached to the organic El panel to complete a recycled organic EL module.

In the present exemplary embodiment, recycled products are used as all of the materials and members; however, an optimum distribution may be employed, for example, by partially using recycled products and partially using new products depending on characteristics, owned members, etc.

(Another Exemplary Embodiment)

As another exemplary embodiment, it is conceivable to employ a configuration of incorporating a timekeeping timer, information processing means thereof, and communication means, and capturing the status of usage of the organic EL panel through, for example, an Internet line so that pass-over of the product life (brightness life) of the organic EL panel can be recognized. Information management/operation may be carried out by a producing/recycling company or may be carried out by a department or company which carries out information management/operation. The information of pass-over of the life is delivered to and recognized by a user who uses the organic El panel. As a way to determine whether the product life has expired, the organic El panel may be blinked or an attempt can be made activate the device display as well as the above description. Also, contact to communication means such as a personal computer or a mobile phone may be made. As collection of the organic El panel, the panel may be directly set to the producing/recycling company by the postal service or the like, or the panel may be collected by the operating department/company.

Separation of the collected organic EL panel, recycling of members, and panel recycling steps can be carried out in a manner similar to that described above. If members are shared by various organic EL lighting models in designing stages of, recycling efficiency is improved, and the effect of price reduction is also large.

Examples of utilization of a surface emitting device include backlights of, for example, organic EL lighting devices and liquid crystal displays.

This application claims priority based on JP Application No. 2010-249736 filed on 8 th Nov. 2010, all disclosures of which are thereby incorporated by reference.

The invention claimed is:

1. A collecting/recycling system of an organic EL lighting device using an organic EL panel, the system comprising:
   information collecting means that obtains a status of the organic EL panel used in a market;
   information processing means that processes and stores, as collection/recycling information, information about a reutilizable member, part, and material of the organic EL panel;
   collection/recycling predicting means that predicts a timing and a quantity of the reutilizable member, part, and material of the organic EL panel, whose status has been obtained by said information collecting means, to be distributed to a recycling based on the collection/recycling information stored in said information processing means; and
   production plan setting means that sets a production plan of a recycled organic EL panel for recycling the organic EL panel using a part or all of the reutilizable member, part, and material based on the timing and the quantity predicted by said collection/recycling predicting means,
   wherein said information collection means acquires status data indicating whether a product life cycle of the organic EL panel has expired, as one use state of the organic EL panel, by using means that recognizes a product life cycle expiry state of the organic EL panel.

2. The collecting/recycling system of an organic EL lighting device according to claim 1, wherein said information collecting means finds out and manages information and a total volume of the organic EL panel as regards:
   production, shipment, and sales volume of the organic EL panel;
   a status of usage in the market;
   a volume distributed in the market including an in-use volume;
   a collection rate of a product that has passed over a life thereof after usage;
   a recycling rate and a volume for disassembling and reutilizing including a part and material of the organic EL panel; and
   a volume to be discarded, and
   wherein said production plan setting means:
      finds out a volume of an organic EL panel to be newly produced and sold and a volume of the organic EL panel to be collected, recycled, and sold;
      sets the production plan including the organic EL panel to be newly produced and sold, and the organic EL panel to be collected, recycled, and sold; and
      carries out price setting.

3. The collecting/recycling system of an organic EL lighting device according to claim 1, wherein said production plan setting means determines a volume of the organic EL panel to be newly produced and sold and a volume of the organic EL panel to be collected, and
   wherein said production plan setting means sets the production plan including the organic EL panel to be newly produced and sold.

4. The collecting/recycling system of an organic EL lighting device according to claim 3, wherein said production plan setting means sets the production plan that further includes the organic EL panel to be collected, recycled, and sold.

5. The collecting/recycling system of an organic EL lighting device according to claim 1, wherein the product life cycle includes a brightness life of the organic EL panel.

6. The collecting/recycling system of an organic EL lighting device according to claim 1, wherein said information processing means applies a timekeeping timer to acquire the product life cycle of the organic EL panel.

7. The collecting/recycling system of an organic EL lighting device according to claim 1, wherein said information processing means acquires the product life cycle of the organic EL panel through Internet.

8. The collecting/recycling system of an organic EL lighting device according to claim 1, wherein the system is configured to deliver information of pass-over of the product life cycle to a user of the organic El panel.

9. The collecting/recycling system of an organic EL lighting device according to claim 1, wherein, in said indicating the product life cycle of the organic EL panel, said information collection means determines whether the product life cycle of the organic EL panel is expired when the organic El panel blinks.

10. The collecting/recycling system of an organic EL lighting device according to claim 1, wherein the information collecting means obtains the status of the organic EL panel in a real time.

11. The collecting/recycling system of an organic EL lighting device according to claim 1, wherein the collection/recycling predicting means predicts the timing and the quantity of the reutilizable member, part, and material of the organic EL panel based on the product life cycle.

* * * * *